(12) United States Patent
Hiraiwa et al.

(10) Patent No.: US 7,722,692 B2
(45) Date of Patent: May 25, 2010

(54) CERIUM OXIDE-BASED ABRASIVE, AND PRODUCTION METHOD AND USE THEREOF

(75) Inventors: Tadashi Hiraiwa, Iwaki (JP); Tomoyuki Masuda, Iwaki (JP); Naoki Bessho, Iwaki (JP)

(73) Assignee: Show a Denko K.K., Tokyo (JP)

( * ) Notice: Subject to any disclaimer, the term of this patent is extended or adjusted under 35 U.S.C. 154(b) by 79 days.

(21) Appl. No.: 11/887,910

(22) PCT Filed: Apr. 4, 2006

(86) PCT No.: PCT/JP2006/307525
§ 371 (c)(1),
(2), (4) Date: Oct. 4, 2007

(87) PCT Pub. No.: WO2006/107116
PCT Pub. Date: Oct. 12, 2006

(65) Prior Publication Data
US 2009/0035202 A1    Feb. 5, 2009

(30) Foreign Application Priority Data
Apr. 4, 2005    (JP) ............................. 2005-107637

(51) Int. Cl.
*C09C 1/68* (2006.01)
*C09K 3/14* (2006.01)
*B24D 3/02* (2006.01)

(52) U.S. Cl. .......................................... 51/309; 51/293

(58) Field of Classification Search .......... 257/E21.243, 257/E21.244; 451/41, 42, 287, 526, 533; 423/263; 51/307, 308, 309, 298, 293
See application file for complete search history.

(56) References Cited

U.S. PATENT DOCUMENTS

| | | | | |
|---|---|---|---|---|
| 2,722,471 | A | * 11/1955 | Hirsch et al. ............... | 423/21.1 |
| 4,497,785 | A | * 2/1985 | Tilley et al. ................. | 423/263 |
| 6,221,118 | B1 | * 4/2001 | Yoshida et al. .............. | 51/309 |
| 6,986,798 | B2 | 1/2006 | Bessho et al. | |
| 2004/0043613 | A1 | 3/2004 | Bessho et al. | |

FOREIGN PATENT DOCUMENTS

| | | | |
|---|---|---|---|
| JP | 9-183966 | A | 7/1997 |
| JP | 11-269455 | A | 10/1999 |
| JP | 2002-129147 | A | 5/2002 |
| JP | 2002-224949 | A | 8/2002 |
| JP | 2002-302667 | A | 10/2002 |
| JP | 2002-302668 | A | 10/2002 |
| JP | 2002-317173 | A | 10/2002 |
| JP | 2002-371267 | A | 12/2002 |
| WO | WO 02/44300 | * | 6/2002 |

* cited by examiner

*Primary Examiner*—Jerry Lorengo
*Assistant Examiner*—Heng M Chan
(74) *Attorney, Agent, or Firm*—Sughrue Mion, PLLC

(57) ABSTRACT

The present invention provides a cerium oxide-based abrasive ensuring high removal rate, less generation of scratches, high-precision polished surface with small surface roughness, and a safe, simple and low-cost production process. Further, the present invention provides a method for producing such an abrasive. The method of the present invention comprises (a) adding a precipitant to an aqueous cerium-containing light rare-earth salt solution to precipitate a light rare-earth salt, thereby obtaining a first slurry containing a light rare-earth salt particle; (b) adding a fluorinating agent to a slurry containing a light rare-earth salt particle to react the light rare-earth salt with the fluorinating agent, thereby obtaining a second slurry containing a light rare-earth fluoride particle; (c) mixing the first slurry and the second slurry to obtain a mixed slurry; and (d) drying and firing the mixed slurry, and a cerium oxide-based abrasive obtained by this method. The abrasive of the present invention is produced by the method of the present invention.

15 Claims, No Drawings

CERIUM OXIDE-BASED ABRASIVE, AND PRODUCTION METHOD AND USE THEREOF

CROSS REFERENCE TO RELATED APPLICATIONS

This application is a National Stage of International Application No. PCT/JP2006/307525 filed on Apr. 4, 2006, claiming priority based on Japanese Patent Application No. 2005-107637, filed Apr. 4, 2005, the contents of all of which are incorporated herein by reference in their entirety.

TECHNICAL FIELD

The present invention relates to a cerium oxide-based abrasive for use in the polishing of glass and the like, and a production method and use thereof. More specifically, the present invention relates to a cerium oxide-based abrasive used for surface polishing of a glass substrate for display panels such as liquid crystal display panels and a glass substrate for magnetic disks, and a production method and a use method thereof.

BACKGROUND ART

In recent years, a glass material is being used for various uses. Particularly, high-precision surface polishing for a flat and defect-free surface with small surface roughness is demanded for optical lens; a glass substrate of a recording medium for optical disks or magnetic disks; a glass substrate for display panels such as plasma display panel (PDP), thin-film transistor (TFT) type liquid crystal display (LCD) panel and twisted nematic (TN) type LCD panel; a color filter for liquid crystal TVS; and a glass substrate for LSI photomask. As for these glass substrates, a requirement for a reduction in production cost of the substrate along with high-precision surface finishing is increasing.

Incidentally, the display above is used as a monitor for desktop personal computers, or a monitor for liquid crystal televisions, cellular phones, notebook computers, personal digital assistants, digital cameras and the like; and the magnetic disk above is used as a hard disk for mobile devices.

In order to surface polish various types of glass, materials such as cerium oxide, zirconium oxide, iron oxide and silicon dioxide have been conventionally used. In recent years, a cerium oxide-based abrasive mainly comprising cerium oxide has been predominantly used because of high polishing efficiency.

A cerium oxide-based abrasive can be produced by using an ore such as bastnaesite concentrate as the starting material. For example, in the case of producing a cerium oxide-based abrasive by using bastnaesite concentrate as the staring material, impurities in the bastnaesite concentrate are removed by using physicochemical separation, and the residue is then ground to adjust the particle size and further dried. After firing at 600 to 1,000° C. in a rotary kiln or a shuttle kiln, the particle size is again adjusted through disintegration and classification, whereby a cerium oxide-based abrasive is obtained.

Also, recently, there has been proposed a method of grinding a light rare-earth carbonate as the raw material, forming a slurry, adding thereto hydrofluoric acid to effect partial fluorination, and then performing firing (Japanese Unexamined Patent Publication No. 9-183966); a method of calcining a light rare-earth salt to obtain a rare-earth oxide, and subjecting this rare-earth oxide to grinding, treatment with mineral acid and then with ammonium fluoride, and firing (Japanese Unexamined Patent Publication No. 11-269455); and a method of adding a rare-earth fluoride to a rare-earth oxide, and performing wet grinding, drying, firing and classification (Japanese Unexamined Patent Publication No. 2002-224949). Furthermore, in order to not involve the grinding step or greatly simplify the grinding step, a method of adding a precipitant to a cerium-containing light rare-earth salt solution to precipitate fine particles of a light rare-earth salt, thereby obtaining a slurry, adjusting the size of particles in the slurry, subjecting the slurry to fluorination and then to solid-liquid separation, and firing the obtained solid component to produce an abrasive, has been proposed (Japanese Unexamined Patent Publication No. 2002-371267).

However, in the case of fluorinating a light rare-earth salt or a rare-earth oxide obtained by firing a light rare-earth salt as in Japanese Unexamined Patent Publication Nos. 9-183966, 11-269455 and 2002-224949, such a material generally has a large particle diameter and needs to be ground by a wet ball mill or the like. Also, after grinding, a large number of steps must be passed through for drying, firing, disintegration, classification and the like. In general, these steps are performed by a batch system and troublesome task, and the production cost of the abrasive cannot be reduced.

Furthermore, in the case of partially fluorinating a light rare-earth salt or rare-earth oxide particle by adding a fluorine-containing substance such as ammonium fluoride or hydrofluoric acid as in Japanese Unexamined Patent Publication Nos. 9-183966, 11-269455 and 2002-371267, the fluorination reaction proceeds at an extraordinarily high rate in the subsequent firing step to allow for growth of abnormal particles and formation of coarse particles, and the coarse particle may be mixed in the abrasive.

DISCLOSURE OF THE INVENTION

The present invention provides a high-quality and inexpensive abrasive for polishing glass or the like, and a production method thereof in order to produce a high surface-precision glass substrate at low cost.

Under these circumstances, intensive studies have been made by the present inventors, as a result, the present inventors have found an abrasive for the polishing of glass and the like, which ensures production at a low cost with good efficiency, high removal rate, less generation of scratches, and high-precision polished surface with small surface roughness; and a production method thereof.

The present invention is as follows.

(1) A method for producing a cerium oxide-based abrasive, comprising:

(a) adding a precipitant to an aqueous cerium-containing light rare-earth salt solution to precipitate a light rare-earth salt (in the present invention, a light rare-earth hydroxide is also included), thereby obtaining a first slurry containing a light rare-earth salt particle having an average particle diameter of 0.1 to 3 μm;

(b) adding a fluorinating agent to a slurry containing a light rare-earth salt particle having an average particle diameter of 0.1 to 3 μm to react the light rare-earth salt with the fluorinating agent, thereby obtaining a second slurry containing a light rare-earth fluoride particle having an average particle diameter of 0.1 to 3 μm;

(c) mixing the first slurry and the second slurry to obtain a mixed slurry; and (d) drying and firing the mixed slurry.

(2) The method for producing a cerium oxide-based abrasive as described in (1) above, wherein in the step (b), a part of the first slurry is used as the slurry containing a light rare-earth salt particle.

(3) The method for producing a cerium oxide-based abrasive as described in (1) or (2) above, wherein the aqueous cerium-containing light rare-earth salt solution in the step (a) is obtained by a method comprising physicochemically separating and removing impurities other than rare-earth elements, and Nd and heavier rare-earth elements from an ore containing rare-earth elements.

(4) The method for producing a cerium oxide-based abrasive as described in any one of (1) to (3) above, wherein at least either one of the light rare-earth salt particles in the steps (a) and (b) is selected from the group consisting of a carbonate particle, a hydroxide particle, an oxalate particle and a mixture thereof.

(5) The method for producing a cerium oxide-based abrasive as described in any one of (1) to (4) above, wherein the fluorine content of the cerium oxide-based abrasive is from 0.1 to 10 mass %.

(6) The method for producing a cerium oxide-based abrasive as described in any one of (1) to (5) above, wherein the step (a) comprises removing impurities other than a light rare-earth salt by performing washing after the precipitation of a rare-earth salt particle.

(7) The method for producing a cerium oxide-based abrasive as described in any one of (1) to (6) above, wherein a wet grinding is not performed during the steps (a) to (d).

(8) The method for producing a cerium oxide-based abrasive as described in any one of (1) to (7) above, wherein the step (d) further comprises performing classification.

(9) A cerium oxide-based abrasive produced by the method described in any one of (1) to (8) above.

(10) The cerium oxide-based abrasive as described in (9) above, wherein the abrasive is in a slurry.

(11) A method for polishing a glass substrate, comprising polishing a glass substrate by using the cerium oxide-based abrasive described in (9) above.

(12) A method for producing a glass substrate, comprising polishing a glass substrate by the method described in (11) above.

(13) A method for producing an optical lens, a hard disk, a display panel, a filter for cutting off a specific frequency, or a photomask for LSI or a display panel, wherein the method comprises polishing a glass substrate by the method described in (11) above.

According to the method of the present invention, a light rare-earth salt particle and a light rare-earth fluoride particle, which are fine and have a particle diameter close to the product particle size of an abrasive, are used, so that the conventional wet grinding step can be dispensed with, and a cerium oxide-based abrasive can be produced simply with good production efficiency at a low production cost.

Also, by the use of the cerium oxide-based abrasive of the present invention, a polished article having a polished surface with less scratches, small surface roughness and good quality can be obtained at a high removal rate.

The present invention is described in detail below.

BEST MODE FOR CARRYING OUT THE INVENTION

The method for producing a cerium oxide-based abrasive of the present invention comprises (a) adding a precipitant to an aqueous cerium-containing light rare-earth salt solution to precipitate a light rare-earth salt, thereby obtaining a first slurry containing a light rare-earth salt particle having an average particle diameter of 0.1 to 3 μm; (b) adding a fluorinating agent to a slurry containing a light rare-earth salt particle having an average particle diameter of 0.1 to 3 μm to react the light rare-earth salt with the fluorinating agent, thereby obtaining a second slurry containing a light rare-earth fluoride particle having an average particle diameter of 0.1 to 3 μm; (c) mixing the first slurry and the second slurry to obtain a mixed slurry; and (d) drying and firing the mixed slurry, and optionally performing classification.

<First Slurry>

The aqueous cerium-containing light rare-earth salt solution used in the step (a) of the present method for producing a cerium oxide-based abrasive can be obtained by physicochemically separating and removing components other than rare-earth elements, such as alkali metal, alkaline earth metal and radioactive substance, and neodymium (Nd) and heavier rare-earth elements from a rare-earth concentrate mainly containing cerium (Ce), lanthanum (La), praseodymium (Pr), neodymium (Nd) and the like.

More specifically, in the case of obtaining an aqueous cerium-containing light rare-earth salt solution from a rare-earth concentrate, such an ore is roasted together with sulfuric acid to produce a sulfate, this sulfate is dissolved in water, an alkaline earth metal, a radioactive substance and the like are removed as insoluble matters. A mixed rare-earth hydroxide is then precipitated by using an alkali such as sodium hydroxide, the resulting precipitate is dissolved with hydrochloric acid to obtain a mixed rare earth chloride solution. Medium-to-heavy rare earths and Nd out of rare-earth components are chemically separated and removed from the mixed rare-earth chloride solution by the solvent extraction process. The medium-to-heavy rare earth indicates a rare earth having an atomic number larger than Pm (promethium).

Particularly, in the case of using a complex mixed ore of bastnaesite and monazite, generally, an alkaline earth metal, a radioactive substance and the like are chemically separated and removed by the above-described method of roasting a rare-earth concentrate with sulfuric acid. In the case of using a single ore of bastnaesite, the separation and removal are generally achieved by a separation method of dissolving the rare-earth component in sulfuric acid or concentrated hydrochloric acid because the composition is relatively simple. Incidentally, the method for chemically separating and removing medium-to-heavy rare earths and Nd is generally a solvent extraction method.

(Precipitation of Light Rare-Earth Salt)

The precipitant used in the present method for producing a cerium oxide-based abrasive is any precipitant capable of precipitating a light rare-earth salt particle when added to an aqueous cerium-containing light rare-earth salt solution.

As for this precipitant, a carbonate such as sodium carbonate and ammonium bicarbonate, a hydroxide such as ammonium hydroxide, an oxalic acid or the like may be used to precipitate a light rare-earth carbonate, hydroxide or oxalate or the like, respectively. In particular, it is easy and therefore, preferable to obtain a light rare-earth carbonate by using ammonium bicarbonate.

At the precipitation of a light rare-earth salt from the cerium-containing light rare-earth salt solution, the precipitation conditions are controlled so that the particle obtained by the precipitation can have an average particle diameter of 0.1 to 3 μm. By the control to this range, the average particle diameter of the final abrasive can be easily adjusted to be from 0.1 to 3 μm. If the average particle diameter of the final abrasive is less than 0.1 μm, the removal rate may decrease, though the polishing precision can be elevated. On the other hand, if the average particle diameter of the final abrasive exceeds 3 μm, many scratches may be produced on the polished surface. The particle diameter of the light rare-earth salt precipitated can be adjusted by controlling the processing conditions such as concentration and temperature of the cerium-containing light rare-earth salt solution, speed and time of the stirring, kind and concentration of the precipitant, and dropping rate of the precipitant into the cerium-containing light rare-earth salt solution.

(Washing)

The first slurry obtained by precipitating a light rare-earth salt particle may be optionally washed by decantation or the like so as to remove impurities other than the light rare-earth salt particle.

<Second Slurry>

(Slurry Containing Light Rare-Earth Salt Particle)

The slurry containing a light rare-earth salt particle, used in the step (b) of the present method for producing a cerium oxide-based abrasive, can be obtained similarly to that used in the step (a), that is, by adding a precipitant to an aqueous cerium-containing light rare-earth salt solution to precipitate a light rare-earth salt. A part of the first slurry can also be separated and used as this slurry.

(Fluorinating Agent)

The fluorinating agent used in step (b) of the present method for producing a cerium oxide-based abrasive may be any compound capable of fluorinating the light rare-earth salt in the slurry, and examples of the fluorinating agent which can be used include hydrofluoric acid, ammonium fluoride and acidic ammonium fluoride. Here, the light rare-earth salt in the slurry can be substantially completely or partially fluorinated. The obtained light rare-earth fluoride preferably has, after drying at 400° C., an entire rare earth content of approximately from 60 to 75 mass % and/or a fluorine content of 20 to 30 mass %.

<Mixed Slurry>

(Mixing)

The mixing of the first slurry containing a light rare-earth salt particle with the second slurry is preferably performed in a wet state. In the case of producing a cerium oxide-based abrasive by mixing the first slurry and the second slurry in this way, the fluorination reaction in the subsequent firing step gradually proceeds, and this does not allow for growth of abnormal particles and formation of localized coarse particles and is advantageous for obtaining a good-quality abrasive not containing a coarse particle, as compared with the method of producing a cerium oxide-based abrasive by adding ammonium fluoride, hydrofluoric acid or the like to a light rare-earth salt to effect partial fluorination.

In the mixing of the first slurry and the second slurry, a stirrer, a high-speed stirrer and the like can be used. If desired, the slurries may be mixed by a grinder such as wet ball mill, attritor and bead mill. However, in the method of the present invention, the desired particle size distribution can be achieved even without using such a grinder. In the case of not using a grinder, the number of steps can be decreased, and the problem of foreign matter mingling from the grinding medium or the like and causing scratches during polishing can be avoided. As for the mixing amount of the light rare-earth fluoride based on the light rare-earth salt, the slurries are preferably mixed to adjust such that that the finally obtained cerium oxide-based abrasive has a fluorine content of 0.1 to 10 mass %.

(Washing)

After wet mixing the slurry containing a light rare-earth salt particle and the slurry containing a light rare-earth fluoride particle, the mixed slurry is preferably washed so as to remove impurity ion dissolved therein. The washing of the mixed slurry is usually performed with use of water by repeating decantation several times until the impurity ion is removed. At the washing, a reagent may be added, if desired, so that a mixed slurry reduced in the impurity content can be obtained after the washing.

<Drying and Firing>

In the method of the present invention, the cerium oxide-based abrasive is fundamentally produced by performing drying, firing, and optionally disintegration and classification without grinding the mixed slurry, but the present invention is not limited thereto and a grinding step of the mixed slurry may be provided.

For drying the mixed slurry, a centrifugal separator, an electric furnace, a shuttle kiln or a rotary kiln can be used. In particular, a rotary kiln is preferably used for the drying. The drying and firing can be performed in the air which is an oxidative atmosphere. The temperature at the drying and firing needs to be 400° C. or more for converting the cerium-containing light rare earth into a rare-earth oxide, and is generally set to a range of 600 to 1,300° C., preferably from 700 to 1,200° C. The fired product is optionally disintegrated and classified to obtain a cerium oxide-based abrasive. The disintegration may be performed by using a disintegrating machine which, for example, causes collision against an impact plate, collision with each other or the like, but the present invention is not limited thereto. The disintegration is preferably performed by a dry system. In the classification, a pneumatic classifier or the like may be used, but the present invention is not limited thereto.

<Cerium Oxide-Based Abrasive of the Present Invention>

In the cerium oxide-based abrasive of the present invention obtained as described above, the total rare earth content is preferably 90 mass % or more in terms of the oxide. Also, cerium preferably accounts for 40 mass % or more, more preferably 60 mass % or more, in terms of the oxide, based on all rare earths contained. Furthermore, the fluorine content of the cerium oxide-based abrasive is preferably from 0.1 to 10 mass %.

<Use of Cerium Oxide-Based Abrasive of the Present Invention>

The cerium oxide-based abrasive of the present invention is usually used by dispersing it in a dispersion medium such as water to form a slurry of approximately from 5 to 30 mass %. For forming the slurry, a water-soluble organic solvent such as ethylene glycol, polyethylene glycol or the like may be used, if desired, but water is usually used.

At the preparation of a slurry of the cerium oxide-based abrasive, mechanical dispersion using a stirrer, a high-speed mixer or the like is performed. Also, when a phosphate having a dispersing activity, such as tripolyphosphate and hexametaphosphate, or a polymer dispersant such as polyacrylate is used, the viscosity of the slurry can be reduced and a high-concentration slurry can be easily prepared. Furthermore, an effect of preventing precipitation of the slurry can be achieved by adding a polymer such as methyl cellulose, carboxymethyl cellulose and polyvinyl alcohol. The degree of aggregation or dispersion can be controlled by controlling the amount of the phosphate or polymer dispersant and in this case, a slurry having an appropriately controlled precipitation property and good workability can be obtained.

In order to enhance the polishing efficiency of the cerium oxide-based abrasive of the present invention, a substance having a polishing promotion effect on glass may be added, and examples thereof include an amino acid-based compound such as arginine; an amine-based compound such as melamine and triethanolamine; and an organic acid such as citric acid, tartaric acid, malic acid and gluconic acid.

When a glass substrate or the like is polished by using the cerium oxide-based abrasive of the present invention, polishing can be performed at an excellent removal rate without causing a surface defect such as pit and scratch, and a qualitatively excellent polished surface can be obtained.

EXAMPLES

The present invention is described in greater detail below by referring to Examples, but the present invention is not limited to these Examples.

Example 1

A: Production of Cerium Oxide-Based Abrasive (i) Production of First Slurry Containing Light Rare-Earth Carbonate or Hydroxide Particle A cerium-containing light rare-earth chloride solution (total rare earth concentration in the light rare-earth chloride solution: 300 g/L in terms of oxide) was obtained by physicochemically separating and removing components other than a light rare earth, such as alkali metal, alkaline earth metal and radioactive substance, and Nd and heavier rare-earth elements, from a natural rare earth concentrate containing Ce, La, Pr, Nd and the like in a large amount. Pure water was added to the obtained light rare-earth chloride solution such that the total rare earth concentration became 50 g/L in terms of oxide, whereby 100 L of a light rare-earth chloride solution was produced. After controlling the temperature of the solution to 30° C., an aqueous ammonium bicarbonate solution prepared by dissolving ammonium bicarbonate in pure water in a concentration of 50 g/L was added dropwise thereto with stirring, and by continuing the stirring for 2 hours, a light rare-earth carbonate mainly comprising cerium oxide was precipitated to obtain a first slurry containing a light rare-earth carbonate particle. Here, the light rare-earth carbonate in this first slurry was sampled, and the average particle diameter (D50) was measured and found to be 2.0 µm.

(ii) Production of Second Slurry Containing Light Rare-Earth Fluoride Particle

A part of the first slurry obtained in (i) above was separated, and an aqueous hydrofluoric acid solution prepared by diluting hydrofluoric acid with pure water to a concentration of 10 wt % was added dropwise thereto to completely fluorinate the light rare-earth salt, whereby a second slurry containing a light rare-earth fluoride particle was obtained. Here, the light rare-earth fluoride in this second slurry was sampled, and the average particle diameter (D50) was measured and found to be 2.0 µm.

(iii) Production of Cerium Oxide-Based Abrasive

While stirring the first slurry containing a light rare-earth carbonate particle in a stirrer, the second slurry containing a light rare-earth fluoride particle was added thereto and mixed. The mixture was stirred for 2 hours and then precipitated by once stopping the stirring so as to remove impurity ion dissolved in the slurry, and the supernatant was removed. An operation of adding pure water thereto, stirring the mixture for 2 hours, precipitating it by once stopping the stirring, and then removing the supernatant was repeated 5 times, and finally, the supernatant was removed for concentrating the slurry, whereby a mixed slurry not containing impurity ion and having an average particle diameter (D50) of 2.0 µm was prepared.

This concentrated and mixed slurry was dried in a box-type drier at 150° C., and the lump produced by the drying was loosened and fired at 900° C. in a rotary kiln (length of furnace core tube: 1,000 mm, inner diameter: ϕ60 mm). The fired powder was a massive particle and therefore, disintegrated by an atomizer, and a classification operation was performed by using a pneumatic classifier, whereby a cerium oxide-based abrasive was produced. The average particle diameter (D50) of the obtained cerium oxide-based abrasive was 1.6 µm. Incidentally, D50 is a particle diameter corresponding to a 50% cumulative value in the volume distribution measured by using Coulter Multisizer Model IIE (manufactured by Coulter).

The obtained cerium oxide-based abrasive was dispersed in water to prepare a slurry having a concentration of 10 mass %.

B: Polishing Test

An alkali-free glass (surface area: 75 m$^2$) for thin-film transistor (TFT) liquid crystal display panels was used as the article to be processed. The polishing machine and polishing conditions are as follows.

<Polishing Conditions>
Polishing machine: 4-Way double-side polishing machine
Number of glass substrates processed:
  6 substrates/batch×2 batches
Polishing Pad:
  Foamed polyurethane pad (MHC-15A, produced by Rhodel Nitta Inc.)
Rotation speed of low plate: 60 rpm
Feed rate of slurry: 60 ml/min
Processing pressure: 87 g/cm$^2$
Polishing time: 20 min The polished glass was taken out from the polishing machine, subjected to ultrasonic washing with pure water and then washing with pure water, and dried.

C: Evaluation of Glass Substrate

With respect to six alkali-free glass substrates for TFT liquid crystal display panels, the thickness was measured by a micrometer before and after polishing at four locations per one substrate, and the measured values of 4 locations×6 substrates were averaged to calculate the removal rate (µm/min). Also, the surface of the glass substrate was visually observed by using a halogen lamp of 200,000 lx as the light source, and the number of scratches per polished surface was determined. Furthermore, the average centerline surface roughness of the glass surface was measured by TALYSTEP (manufactured by Rank-Taylor Hobson).

The average particle diameter D50 of particles in the mixed slurry, the average particle diameter D50 of the abrasive particle, the removal rate, the scratch, and the average centerline surface roughness Ra are shown in Table 1.

Example 2

A cerium oxide-based abrasive was produced in the same manner as in Example 1. However, in Example 2, the temperature of the light rare-earth chloride solution was adjusted to 40° C. and the light rare-earth carbonate was precipitated to form the light rare-earth carbonate slurry (average particle diameter D50: 2.5 µm), and a diluted aqueous solution of hydrofluoric acid was added dropwise to the light rare-earth carbonate slurry to obtain a second slurry (average particle diameter D50: 2.5 µm) containing a light rare-earth fluoride particle. In this example, the average particle diameter (D50) of particles in the obtained mixed slurry was 2.5 µm. The average particle diameter (D50) of the obtained cerium oxide-based abrasive was 2.0 µm.

Polishing by the use of the obtained cerium oxide-based abrasive and polishing evaluation were performed in the same manner as in Example 1. The results are shown in Table 1.

Example 3

A cerium oxide-based abrasive was produced in the same manner as in Example 1. However, in Example 3, the temperature of the light rare-earth chloride solution was adjusted to 25° C. and the light rare-earth carbonate was precipitated to form the light rare-earth carbonate slurry (average particle diameter D50: 1.8 µm), and hydrofluoric acid was added to the light rare-earth carbonate slurry to obtain a second slurry (average particle diameter D50: 1.8 µm) containing a light rare-earth fluoride particle. In this example, the average particle diameter (D50) of particles in the obtained mixed slurry was 1.8 µm. The average particle diameter (D50) of the obtained cerium oxide-based abrasive was 1.4 µm.

Polishing by the use of the obtained cerium oxide-based abrasive and polishing evaluation were performed in the same manner as in Example 1. The results are shown in Table 1.

Example 4

A cerium oxide-based abrasive was produced in the same manner as in Example 1. However, in Example 4, the temperature of the light rare-earth chloride solution was adjusted to 20° C., and the light rare-earth carbonate used for the first and second slurries was precipitated. In this example, the average particle diameters (D50) of the light rare-earth carbonate, light rare-earth fluoride and particles in the mixed slurry were 1.2 µm. The average particle diameter (D50) of the obtained cerium oxide-based abrasive was 1.0 µm.

Polishing by the use of the obtained cerium oxide-based abrasive and polishing evaluation were performed in the same manner as in Example 1. The results are shown in Table 1.

Comparative Example 1

A cerium oxide-based abrasive was produced in the same manner as in Example 1. However, in Comparative Example 1, the temperature of the light rare-earth chloride solution was adjusted to 60° C., and the light rare-earth carbonate used for the first and second slurries was precipitated. In this example, the average particle diameters (D50) of the light rare-earth carbonate, light rare-earth fluoride and particles in the mixed slurry were 4.0 µm. The average particle diameter (D50) of the obtained cerium oxide-based abrasive was 3.2 µm.

Polishing by the use of the obtained cerium oxide-based abrasive and polishing evaluation were performed in the same manner as in Example 1. The results are shown in Table 1.

Comparative Example 2

A ground slurry containing powder particles having an average particle diameter D50 of 1.8 µm was obtained by adding 1,000 g of water to 1,000 g of bastnaesite (average particle diameter D50: 40 µm) and grinding the ore in a wet ball mill. Subsequently, the ground slurry was dried in a drier, fired at 900° C. in a rotary kiln and then subjected to disintegration and classification, whereby a cerium oxide-based abrasive was obtained. The average particle diameter (D50) of the obtained cerium oxide-based abrasive was 1.4 µm.

Polishing by the use of the obtained cerium oxide-based abrasive and polishing evaluation were performed in the same manner as in Example 1. The results are shown in Table 1.

Comparative Example 3

A ground slurry containing powder particles having an average particle diameter D50 of 1.8 µm was obtained by adding 1,000 g of water to 800 g of a commercially available light rare-earth oxide (average particle diameter D50: 15 µm, made in China) and 300 g of a commercially available light rare-earth fluoride (average particle diameter D50: 10 µm, made in China) mainly comprising a cerium oxide, and grinding the mixture in a wet ball mill. Subsequently, the ground slurry was dried in a drier, fired at 900° C. in a rotary kiln and then subjected to disintegration and classification, whereby a cerium oxide-based abrasive was obtained. The average particle diameter (D50) of the obtained cerium oxide-based abrasive was 1.4 µm.

Polishing by the use of the obtained cerium oxide-based abrasive and polishing evaluation were performed in the same manner as in Example 1. The results are shown in Table 1.

Comparative Example 4

A cerium oxide-based abrasive was obtained in the same manner as in Example 1 by adding acidic ammonium fluoride to a light rare-earth carbonate particle-containing slurry (average particle diameter D50: 1.8 µm) such that the finally obtained cerium oxide-based abrasive could have a fluorine content of 5%, and subjecting the slurry to mixing, drying in a drier, firing at 900° C. in a rotary kiln, disintegration and classification. The average particle diameter (D50) of the obtained cerium oxide-based abrasive was 1.4 µm.

Polishing by the use of the obtained cerium oxide-based abrasive and polishing evaluation were performed in the same manner as in Example 1. The results are shown in Table 1.

| | Average Particle Diameter D50 of Raw Material (Mixed slurry) of Abrasive (µm) | Average Particle Diameter D50 of Abrasive (µm) | Polishing Performance | | |
|---|---|---|---|---|---|
| | | | Removal Rate (µm/min) | Scratch (scratches/surface) | Surface Roughness Ra (Å) |
| Example 1 | 2.0 | 1.6 | 0.73 | 0.17 | 7 |
| Example 2 | 2.5 | 2.0 | 0.71 | 0.25 | 8 |
| Example 3 | 1.8 | 1.4 | 0.76 | 0.08 | 6 |
| Example 4 | 1.2 | 1.0 | 0.70 | 0.08 | 5 |
| Comparative Example 1 | 4.0 | 3.2 | 0.67 | 0.42 | 9 |
| Comparative Example 2 | 1.8 | 1.4 | 0.65 | 0.92 | 9 |
| comparative Example 3 | 1.8 | 1.4 | 0.75 | 0.42 | 8 |
| Comparative Example 4 | 1.8 | 1.4 | 0.73 | 0.42 | 7 |

As seen in Table 1, the cerium oxide-based abrasives of Examples 1 to 4 give an alkali-free glass having small surface roughness at an equal or more excellent removal rate without causing scratches, as compared with cerium oxide-based abrasives of Comparative Examples 1 to 4.

The invention claimed is:

1. A method for producing a cerium oxide-based abrasive, comprising:
   (a) adding a precipitant to an aqueous cerium-containing light rare-earth salt solution to precipitate a light rare-earth salt, thereby obtaining a first slurry containing a light rare-earth salt particle having an average particle diameter of 0.1 to 3 μm;
   (b) adding a fluorinating agent to a slurry containing a light rare-earth salt particle having an average particle diameter of 0.1 to 3 μm to react the light rare-earth salt with the fluorinating agent, thereby obtaining a second slurry containing a light rare-earth fluoride particle having an average particle diameter of 0.1 to 3 μm;
   (c) mixing said first slurry and said second slurry to obtain a mixed slurry; and
   (d) drying and firing said mixed slurry.

2. The method for producing a cerium oxide-based abrasive according to claim 1, wherein in the step (b), a part of said first slurry is used as said slurry containing a light rare-earth salt particle.

3. The method for producing a cerium oxide-based abrasive according to claim 1, wherein said aqueous cerium-containing light rare-earth salt solution in the step (a) is obtained by a method comprising physicochemically separating and removing impurities other than rare-earth elements, and Nd and heavier rare-earth elements from an ore containing rare-earth elements.

4. The method for producing a cerium oxide-based abrasive according to claim 1, wherein at least either one of the light rare-earth salt particles in the steps (a) and (b) is selected from the group consisting of a carbonate particle, a hydroxide particle, an oxalate particle and a mixture thereof.

5. The method for producing a cerium oxide-based abrasive according to claim 1, wherein the fluorine content of said cerium oxide-based abrasive is from 0.1 to 10 mass %.

6. The method for producing a cerium oxide-based abrasive according to claim 1, wherein the step (a) comprises removing impurities other than a light rare-earth salt by performing washing after the precipitation of a rare-earth salt particle.

7. The method for producing a cerium oxide-based abrasive according to claim 1, wherein a wet grinding is not performed during the steps (a) to (d).

8. The method for producing a cerium oxide-based abrasive according to claim 1, wherein the step (d) further comprises performing classification.

9. A method for polishing a glass substrate, comprising producing a cerium-oxide abrasive according to the method of claim 1, and then polishing a glass substrate by using the cerium oxide-based abrasive.

10. A method for producing a glass substrate, comprising of polishing a glass substrate by the method of claim 9.

11. A method for producing an optical lens, a hard disk, a display panel, a filter for cutting off a specific frequency, or a photomask for LSI or a display panel, wherein the method comprises polishing a glass substrate by the method of claim 9.

12. The method for producing a cerium oxide-based abrasive according to claim 7, wherein a grinding is not performed during the steps (a) to (d).

13. A method for polishing a glass substrate, comprising producing a cerium-oxide abrasive according to the method of claim 8, and then polishing a glass substrate by using the cerium oxide-based abrasive.

14. A method for producing a glass substrate, comprising polishing a glass substrate according to the method of claim 13.

15. A method for producing an optical lens, a hard disk, a display panel, a filter for cutting off a specific frequency, or a photomask for LSI or a display panel, wherein the method comprises polishing a glass substrate according to the method of claim 13.

* * * * *